M. S. TOWSON.
MOTOR VEHICLE.
APPLICATION FILED SEPT. 26, 1911.

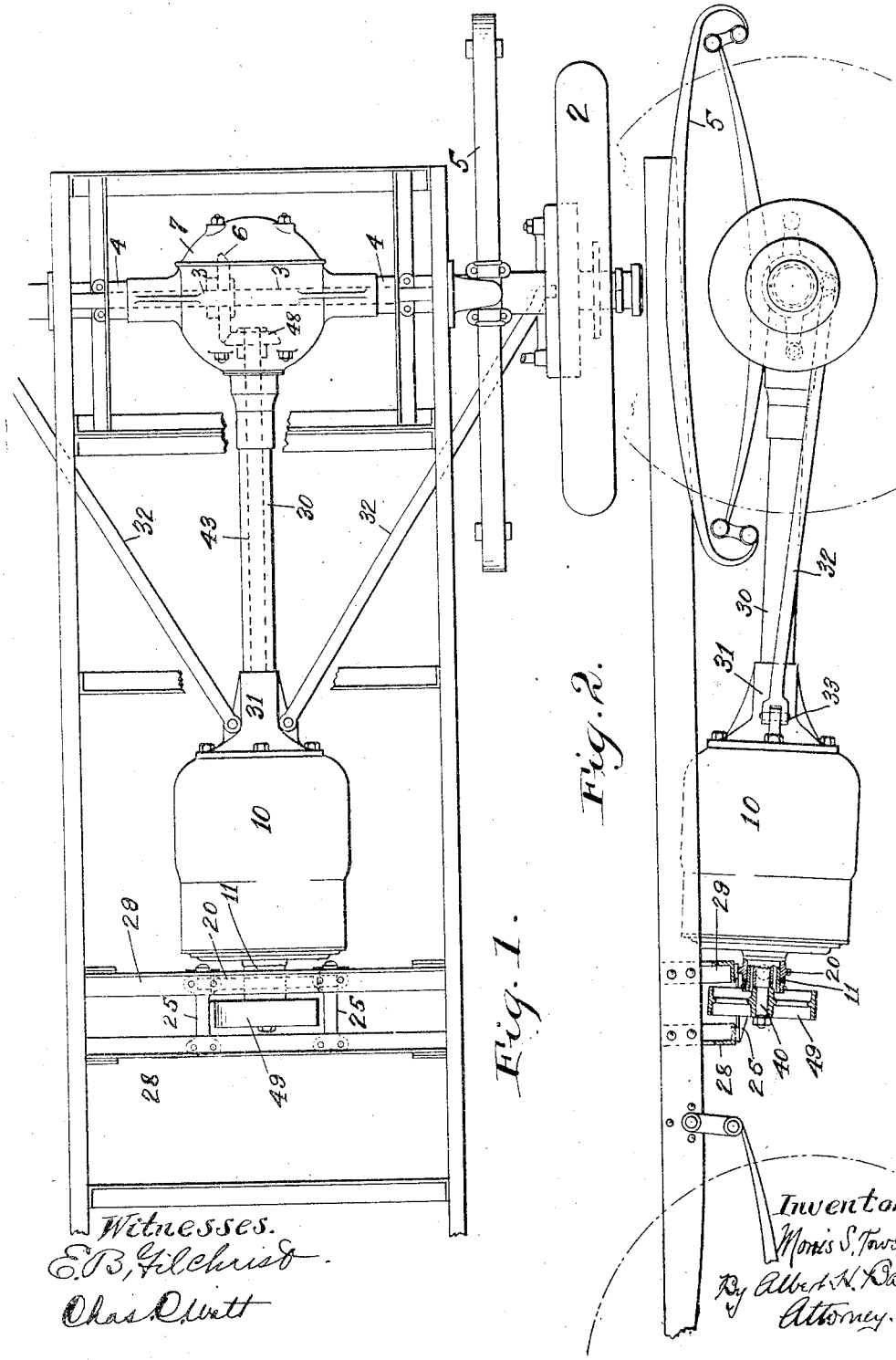

1,112,172.

Patented Sept. 29, 1914.
2 SHEETS—SHEET 2.

UNITED STATES PATENT OFFICE.

MORRIS S. TOWSON, OF CLEVELAND, OHIO, ASSIGNOR, BY MESNE ASSIGNMENTS, TO THE ELWELL-PARKER ELECTRIC COMPANY, OF CLEVELAND, OHIO, A CORPORATION OF OHIO.

MOTOR-VEHICLE.

1,112,172.       Specification of Letters Patent.     Patented Sept. 29, 1914.

Application filed September 26, 1911. Serial No. 651,423.

*To all whom it may concern:*

Be it known that I, MORRIS S. TOWSON, a citizen of the United States, residing at Cleveland, in the county of Cuyahoga and State of Ohio, have invented a certain new and useful Improvement in Motor-Vehicles, of which the following is a full, clear, and exact description, reference being had to the accompanying drawings.

This invention relates to motor vehicles of that class wherein there is a shaft drive.

The object of the invention is to provide such a suspension for the motor and such an arrangement of shaft drive therefrom to the live axles as will be efficient in service, while being simple in construction. To this end I suspend the motor so that it may swing in a vertical fore-and-aft plane, as well as turn on its own axis, and I connect the armature shaft directly with the drive shaft with which it alines and connect the motor casing directly with the housing of the live axle sections and differential mechanism. This arrangement reduces the number of bearings and the consequent transmission losses, places the entire driving mechanism in a completely inclosed housing, and allows the necessary independence of movement between the drive wheels and the frame or body carrying the motor.

My invention includes not only the arrangement of suspension and drive mentioned, but also the particular embodiment thereof herein illustrated and hereinafter more fully described.

Figure 3:
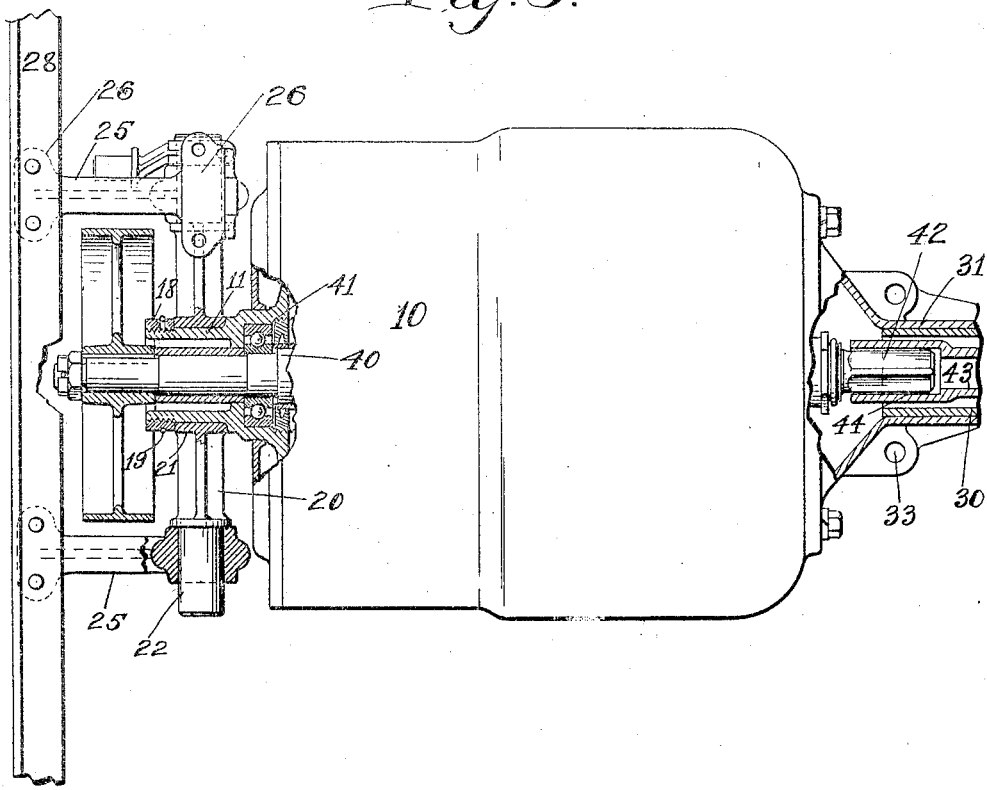
Figure 4:
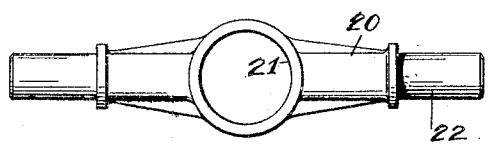

In the drawings, Figure 1 is a plan of the chassis of an electric vehicle embodying my invention; Fig. 2 is a side elevation thereof; Fig. 3 is an enlarged sectional plan of the motor and its supporting machanism; Fig. 4 is a detail view of the trunnion bar which supports the motor at its forward end.

As shown in the drawings, 1 represents the frame of the chassis, 2 the rear wheels, 3 the live axle sections connected with the rear wheels, 4 the housing for such sections, 5 the springs connecting such housings with the chassis frame, and 6 the main gearing of the differential mechanism connected with the live axle sections and contained within the housing 7. This much of the construction may be of any suitable form, as desired.

10 represents the casing of an electric motor. On the forward end of this casing is a tubular extension 11 preferably integral with an end plate of the casing. This extension is journaled in a central opening 21 of a trunnion bar 20 which extends transversely of the vehicle and has its ends formed into trunnions 22 which are journaled in brackets 25 suitably carried by the chassis frame. As shown, the brackets extend longitudinally of the frame and each have a pair of upper feet 26 which are bolted to cross bars 28 and 29 secured to the longitudinal members of the chassis frame. The bars 28 and 29 are shown as angle irons, which is a convenient construction. On the forward end of the tubular extension 11 of the motor frame is threaded a suitable collar 18 to hold the motor swivelly to the trunnion bar. This collar is shown as screwed onto the tubular extension and held by a spring wire 19.

The rear end of the motor casing is bolted to a funnel shaped fitting 31, which surrounds and is rigidly connected with the forward end of a tubular housing 30 connected at its rear end with the housing 7 of the differential mechanism.

32 indicates a pair of diagonal brace bars bolted at their forward ends to ears 33 on the fitting 31 on opposite sides of the housing 30 and bolted at their rear ends to the housings 4 of the live axle sections.

It will be seen from the construction described that the housings, the live axle sections, the housing for the differential, the housing for the drive shaft and the motor frame constitute a rigid, continuous member, operating as a unit. In travel this composite housing swings in a vertical plane by reason of the trunnions turning in their bearings or twists axially within the trunnion bar, as the relation of the driving wheels to the chassis frame varies.

The armature within the motor has its shaft 40 mounted in a pair of ball bearings within the motor frame adjacent to the tubular extension and rear end thereof. The forward bearing is shown at 41. The rear end 42 of the armature shaft is squared or given other angular form. The propeller shaft 43 is formed with a corresponding socket 44 on its forward end, which extends over the armature shaft. Near its rear end this propeller shaft is journaled in the housing 7 of the differential mechanism. On the rear end of the shaft is a pinion 48 meshing with the main gear 6 of the differential mechanism. The armature shaft extends forwardly beyond the trunnion bar 20 and has mounted on such forward extension a suitable fly wheel 49 extending into the space between the cross bars 28 and 29.

It will be seen that the direct drive provided between the armature and the differential mechanism reduces the number of bearings and hence the transmission losses. The mechanism is also simpler and of less parts to wear or get out of order than a construction employing additional reduction gearing, chains or countershafts. The centrally located connection between the motor and the rear axle, as well as the completely inclosing housing, gives a neat appearance to the construction. The motor is easily removed by disconnecting the brackets 25 and unbolting the rear tubular extension from the motor frame. Then the armature shaft may be readily drawn out of the socket of the drive shaft, with which it has an easy sliding engagement.

It should be noted that with my method of suspension the propelling stress of the vehicle is transmitted from the rotating wheels to the body of the vehicle through the motor itself instead of through the springs, thereby making a more effective drive and relieving the springs. The springs rest on the axle housings by suitable sleeves, within which the housings may turn.

Having thus described my invention, what I claim is:

1. In a motor vehicle, the combination, with the frame having a pair of cross bars, of a motor casing having a tubular extension at its forward end, a transverse member in which said tubular extension is journaled, brackets mounted on the cross bars for pivotally carrying the transverse member by the frame, a fly wheel on the forward end of the armature shaft extending into the space between the cross bars, and mechanism including the drive shaft connecting the rear end of the armature shaft with the live axle.

2. In a motor vehicle, the combination, with a main frame, of a transverse bar pivotally carried thereby, a motor casing having a tubular extension about its axis, said extension being journaled in an opening in the transverse bar, a collar secured to the extension on the opposite side of the transverse bar, the armature shaft of the motor extending through the tubular extension of the frame, a fly wheel on said shaft beyond the transverse bar, and mechanism including a drive shaft connecting the other end of the armature with the live axle.

3. In a motor vehicle, the combination, with a chassis frame, of a transverse bar having trunnions at its ends journaled in the frame and having an eye at its center, a motor having a tubular extension on one end of its frame journaled in said eye, an armature within the motor having its shaft journaled in a bearing within the tubular extension, and propelling means for the vehicle connected with the other end of the armature shaft.

4. In a motor vehicle, the combination, with a chasis frame, of a transverse bar having trunnions at its ends journaled in the frame and having an eye at its center, a motor having a tubular extension on one end of its frame journaled in said eye, an armature within the motor having its shaft extending through the tubular extension, a wheel on said shaft beyond the extension, and propelling means for the vehicle connected with the other end of said shaft.

In testimony whereof, I hereunto affix my signature in the presence of two witnesses.

MORRIS S. TOWSON.

Witnesses:
ALOYSIUS C. FLYNN,
JESSE F. THOMPSON.